Feb. 15, 1966  R. D. SCHULTHEISS  3,235,439
RIBBED STRUCTURAL BOARD
Original Filed May 4, 1959

INVENTOR.
RALPH D. SCHULTHEISS
BY
ATTORNEY

United States Patent Office 3,235,439
Patented Feb. 15, 1966

3,235,439
RIBBED STRUCTURAL BOARD
Ralph D. Schultheiss, New Canaan, Conn., assignor to Union Carbide Corporation, a corporation of New York
Original application May 4, 1959, Ser. No. 810,793, now Patent No. 3,019,483, dated Feb. 6, 1962. Divided and this application Sept. 7, 1961, Ser. No. 136,653
10 Claims. (Cl. 161—69)

The present invention relates to a plastic ribbed structural board and, more particularly, to such a board which can be produced in one extrusion operation without the need of additional working or fastening.

This is a division of my copending application entitled, "Method and Apparatus for Producing Extruded Structural Board," Serial No. 810,793, filed May 4, 1959, now Patent No. 3,019,483.

Heretofore, a great variety of plastic sheets and boards of various shapes and sizes have been proposed which could be produced by one or more extrusion steps combined with cutting and fastening steps. However, no ribbed structural board has been previously proposed which can be produced in a single extrusion step without the need for additional working or fastening.

It is, therefore, the main object of the present invention to provide a plastic ribbed structural board which can be produced in a single extrusion step without the need of additional working or fastening.

It is another object of the invention to provide an extruded plastic structural board having interior ribs.

Other aims and advantages of the invention will become apparent from the following description and appended claims.

In accordance with the present invention, there is provided a ribbed structural board comprising at least two spaced apart, substantially parallel membranes of plastic and a multiplicity of plastic ribs disposed between and attached to the membranes at right angles thereto.

The inventive board may be produced as an integral unit by simultaneously extruding two sets of ribs on either side of an extruded central membrane while outside membranes are simultaneously extruded and attached to the outer edges of the supporting ribs. Alternatively, the central membrane can be omitted. The ribs can be extruded in oscillating or undulating paths on one or both sides of the central membrane, and the rib paths on one side of the membrane need not be coincident with rib paths on the other side of the membrane.

The inventive structural board and a preferred method for producing the same will now be described in greater detail by referring to the drawings, in which.

Figure 1:
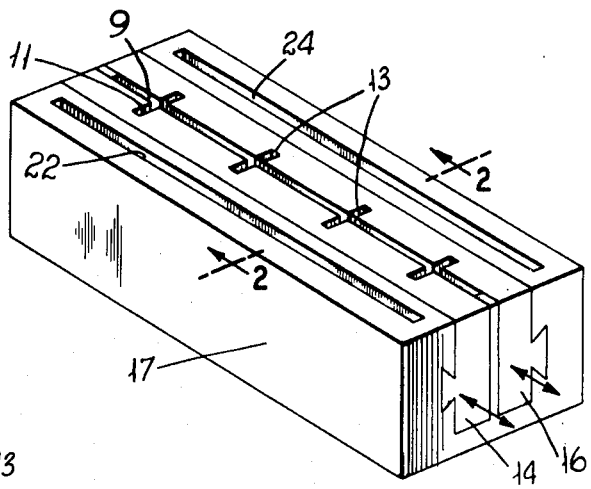
FIG. 1 is an isometric view of the extrusion dies of the invention.
Figure 2:
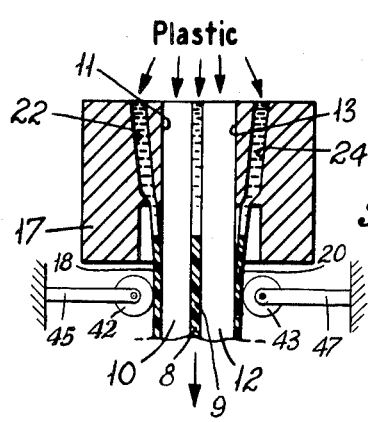
FIG. 2 is a cross-sectional view along the line 2—2 of FIG. 1.

Referring to FIGS. 1, 2, 3, and 5, a central plastic membrane 8 is extruded through the slot 9, formed by open slots in dies 14 and 16, slidably mounted in extrusion block 17 while ribs 10 and 12 are simultaneously extruded through slots 11 and 13 respectively, adjacent to and leading out of slot 9. Slots 11 and 13 are disposed in slidable extruding dies 14 and 16 and the space between these dies forms slot 9. As plastic is extruded downward through slots 9, 11, and 13, dies 14 and 16 are reciprocated in opposite directions so that ribs 10 and 12 from dies 14 and 16, respectively, follow oscillating paths on the central membrane and form thereby the interior supports of the structural board.

Figure 5:
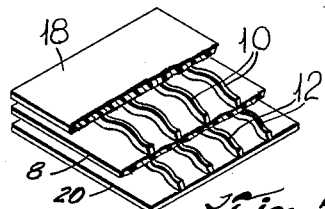
FIG. 5 is an isometric view of a structural board of the invention similar to that shown in plan view in FIG. 3.
Figure 3:
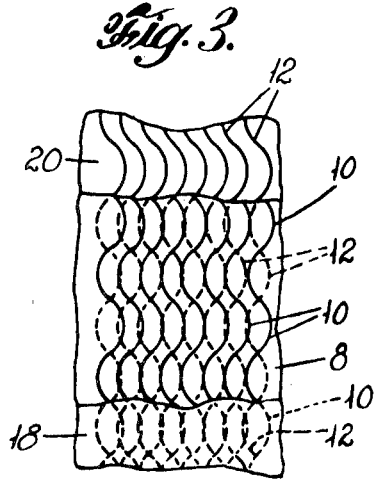
FIG. 3 is a plan view of a portion of the surface of a typical extruded structural board.

Outside membranes 18 and 20 are extruded from slots 22 and 24, respectively, and these membranes join ribs 10 and 12 and are attached thereto as shown in FIGS. 3 and 5. Membranes 18 and 20 form the outside surfaces of the structural board and can be composed of plastics of various colors. Designs can be stamped or extruded thereon. To more firmly bond membranes 18 and 20 to the ribs, means may be disposed below the die support to press the extruded membranes against the extruded ribs. For example, in FIG. 2 rollers 42 and 43 are disposed so as to press membranes 18 and 20 against the ribs 10 and 12. The rollers 41 and 43 are rotatably mounted on rigid supporting members 45 and 47, respectively. The temperature of the plastic should be not more than about 50° C. less than the temperature of extrusion at the time the outside membranes are attached.

It is seen that varying the speed and regularity of the reciprocation of extrusion dies 14 and 16 permits the supporting ribs to be placed in a great many different designs. The structural board produced is strong and light and readily lends itself to a great number of uses for buildings, advertising displays, furniture, etc.

Figure 4:
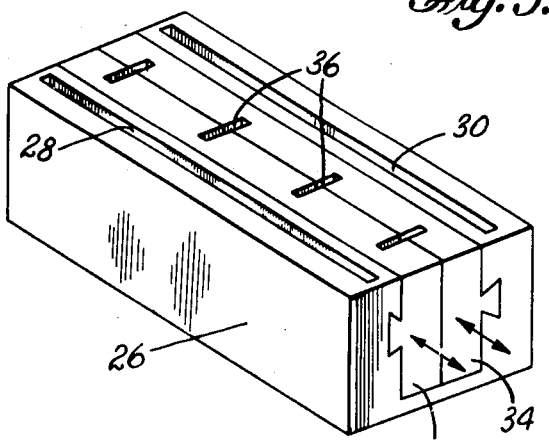
FIG. 4 is an isometric view of a modification of the apparatus of FIG. 1.

In FIG. 4 is shown another embodiment of my invention. A support member 26 having outside membrane extrusion slots 28 and 30 therein supports slidably mounted extrusion dies 32 and 34 having coinciding slots 36 therein. Unlike the extrusion device of FIG. 1, the extruder of FIG. 4 is without a central extrusion slot 9 so that interior supporting ribs extruded from slots 36 are integral with each other rather than with a central membrane. The advantage of this variation is, of course, a saving in the amount of material used.

Any extrudable plastic, thermoplastic or thermosetting, can be used in this invention. The temperature of extrusion will vary with the plastics used.

What is claimed is:

1. An extruded plastic ribbed structural board comprising at least two spaced apart, substantially parallel membranes of plastic material, a first layer of spaced plastic ribs integrally bonded to the inner surface of one of said membranes, and a second layer of spaced plastic ribs integrally bonded to the inner surface of the other of said membranes, the ribs of said first layer continuously extending and forming integral intersections with the ribs of said second layer periodically for the length of the board.

2. An extruded plastic ribbed structural board comprising, at least two spaced substantially parallel membranes of plastic material and at least two layers of spaced plastic ribs situated between said membranes and substantially parallel therewith, the ribs of adjacent layers being disposed in periodic contact with one another to form integral intersections therebetween, the ribs of the layer adjacent each of said membranes being integrally bonded with said membrane along the lengths thereof and at substantially right angles thereto.

3. The ribbed structural board of claim 2 wherein the ribs of adjacent layers cross forming integral intersections therebetween.

4. The ribbed structural board of claim 2 wherein a plurality of the ribs are shaped in undulating wave patterns along the length thereof.

5. The ribbed structural board of claim 2 wherein said ribs are shaped in undulating wave patterns along the lengths thereof and adjacent ribs in succeeding layers are positioned out of phase with one another.

6. The ribbed structural board of claim 2 having another membrane disposed between an adjacent pair of rib layers and integral therewith.

7. The ribbed structural board of claim 6 wherein said other membrane is disposed between adjacent layers of crossing ribs and is integral therewith.

8. The ribbed structural board of claim 6 having three spaced membranes with one of said rib layers disposed between each pair of said membranes and integrally bonded thereto.

9. The ribbed structural board of claim 6 wherein the ribs of said layers are shaped in undulating wave patterns along the length thereof.

10. The ribbed structural board of claim 6 wherein said ribs are shaped in undulating wave patterns along the lengths thereof and adjacent ribs in succeeding layers are positioned out of phase with one another.

References Cited by the Examiner

UNITED STATES PATENTS

| | | | |
|---|---|---|---|
| 839,834 | 1/1907 | Gray | 161—123 |
| 1,565,532 | 12/1925 | Tupper. | |
| 1,628,090 | 5/1927 | Weiss. | |
| 2,108,795 | 2/1938 | Budd. | |
| 2,445,290 | 7/1948 | Gonda | 154—45.9 |
| 2,501,180 | 3/1950 | Kunz | 181—33.1 |
| 2,534,137 | 12/1950 | Lewis | 161—123 |
| 2,644,777 | 7/1953 | Havens | 161—68 |
| 2,699,598 | 1/1955 | Daughterty. | |
| 2,870,857 | 1/1959 | Goldstein. | |

FOREIGN PATENTS

| | | |
|---|---|---|
| 443,167 | 12/1948 | Italy. |
| 47,502 | 1/1940 | Netherlands. |

EARL M. BERGERT, *Primary Examiner.*